Oct. 14, 1952      D. D. TERRILL      2,613,709
TENSIONING MEANS FOR BOW SAW FRAMES
Filed April 9, 1948
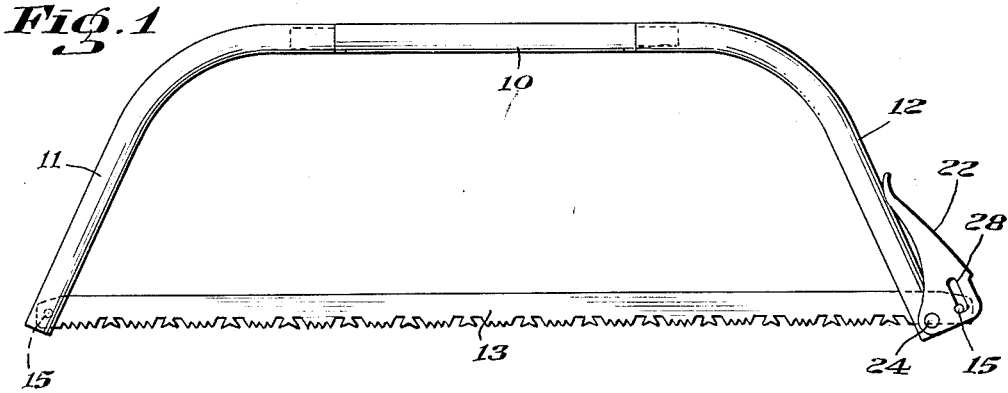
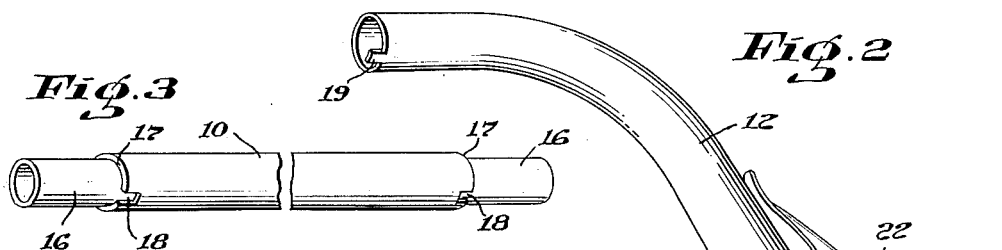
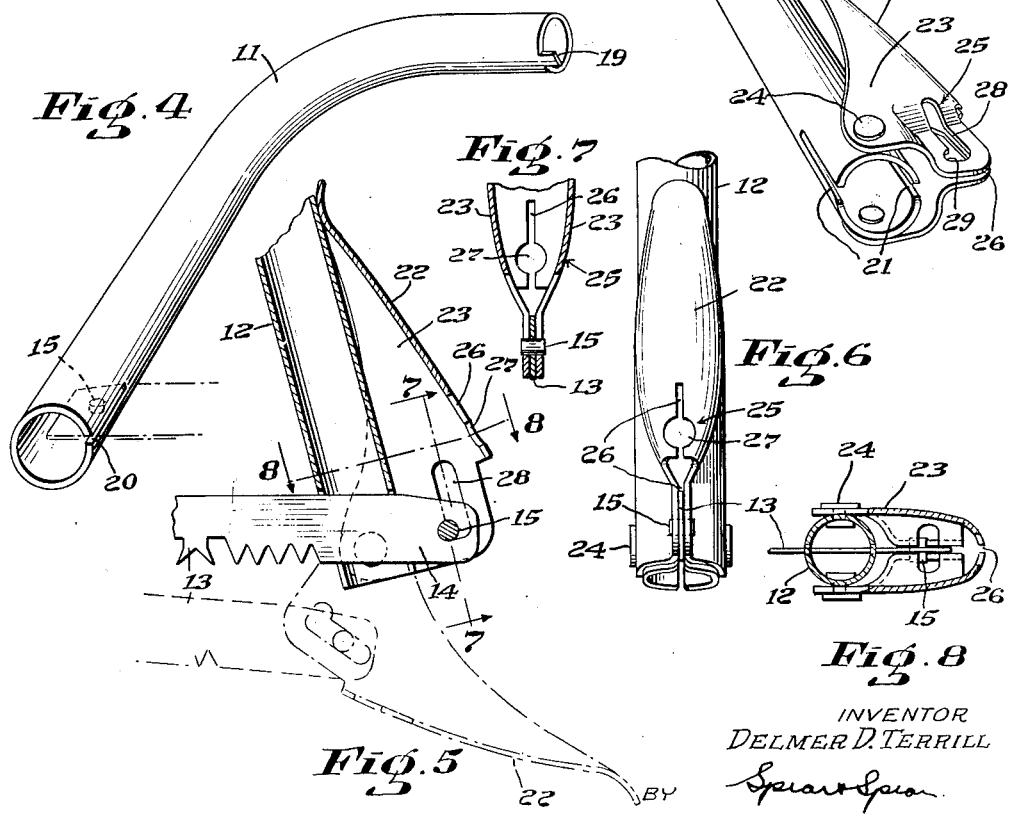
INVENTOR
DELMER D. TERRILL
ATTORNEYS Patented Oct. 14, 1952

2,613,709

UNITED STATES PATENT OFFICE 2,613,709

TENSIONING MEANS FOR BOW SAW FRAME

Delmer D. Terrill, Bangor, Maine; George F. Eaton and The Merrill Trust Company, both of Bangor, Maine, executors of said Delmer D. Terrill, deceased Application April 9, 1948, Serial No. 20,038

2 Claims. (Cl. 145—34)

My present invention relates to saws, saw frames, blade tensioning means therefor, and particularly to sectional frames, each of which is adapted to be quickly and easily assembled and to be rigidly united by the blade when attached to its ends under tension.

While other types of saws may be made in accordance with my invention, wood cutting saws such as those used in cutting pulp or cord wood or by sportsmen best illustrate its novel features and advantages.

In accordance with my invention, I provide a saw frame consisting of a pair of similarly shaped end sections having blade holding means at their outer ends. The inner extremity of one of the end sections has a socket disposed to slidably receive an extension which may be part of the other section and define therewith a shoulder against which the inner extremity of the first named section seats when the frame is assembled. In order to ensure the proper alinement of the blade holding means when the frame is assembled, the shoulder and the extremity seated thereagainst have complemental interlocking portions.

In practice, I form each end section of tubular metal stock so that its inner extremities both present sockets and I also provide an intermediate section of like tubular stock having tubular extensions at its ends dimensioned to slidably enter the sockets with its ends constituting shoulders engageable by the inner extermities of the end sections to space the blade holding means positively in desired relation on the assembly of the frame. The shoulders and the extermities engageable therewith have complemental tongues and recesses disposed to make it impossible to completely assemble the frame unless the blade holding means are in alinement and to lock the sections of the assembled frame against relative rotary motion.

Such a saw frame has many advantages for not only may it be quickly assembled and disassembled but also, should it be desired to use a shorter or a longer saw blade, it is only necessary to substitute another intermediate section of the appropriate length to adapt the saw frame for use with that blade. In addition, the frame sections, in accordance with my invention, may be compactly packaged rendering saw frames in accordance with my invention particularly adaptable to the needs of those going into the woods whether for work or for pleasure.

In order that such a saw frame may be utilized to advantage, it is desirable to have easily operated blade holding means that enable the blade to be securely locked to the frame under tension or released to permit the blade to be removed and replaced or the frame to be disassembled.

To accomplish these results, I provide a saw blade having a transverse stud adjacent each of its ends. One frame end has an open-ended slot to enable one end of the blade to be inserted therein so that its stud serves to lock it thereto. A bell crank, pivoted to the other end of the frame, has cam slots to receive and support the ends of the other stud and, in accordance with my invention, portions of the lever establish a pathway having an entrance to receive that stud when the lever is in one position and to guide the stud ends into those cam slots when the lever is pivoted into its locked, blade tensioning position. Preferably, the lever carrying frame end is bifurcated and the cam slots and stud pathway are located so that, in the first named position, they may be below and forwardly of the pivots of the lever and swing about the extremity of that end into a position in which the stud, locked in the cam slots, is rearwardly of and above the pivots to establish the locked blade tensioning position of the lever with the blade entering the slot established by the bifurcated frame end.

In the accompanying drawings, I have shown an illustrative embodiment of my invention from which these and other of its novel features and advantages will be readily apparent.

In the drawings:

Fig. 1 is a side view of an assembled saw frame with a blade locked thereto.

Fig. 2 is a view, in perspective, of the end section to which the blade tensioning means are attached.

Figs. 3 and 4 are like views, respectively, of the intermediate and other end sections of the frame.

Fig. 5 is a longitudinal section through the extremity of the frame section shown in Fig. 2, showing the blade tensioning means in its operative position and with its blade receiving position being indicated in dotted lines.

Fig. 6 shows the parts of Fig. 5 as viewed from one end of the saw, and

Figs. 7 and 8 are sections along the lines 7—7 and 8—8 respectively of Fig. 5.

In the embodiment of my invention illustrated in the drawings, I have shown my saw frame as consisting of an intermediate section 10 and similarly shaped end sections 11 and 12, the outer extremities of which are provided with means to hold the ends of the saw blade 13. The saw blade 13 has end portions 14 which are preferably identical and each end portion has a transverse stud 15.

In practice, the frame sections 10, 11, and 12 are of tubular metal stock of the same outside and inside diameters and I have shown the intermediate section 10 as having tubular extensions 16 dimensioned to fit within the inner extremities of the end sections 11 and 12 and presenting the extremities of the intermediate section 10 as shoulders 17 against which the extremities of the end sections seat when the saw frame is assembled as shown in Fig. 1. In order that the blade holding means of the outer extremities of the end sections 11 and 12 are properly alined to receive the blade 13 on such assembly, I provide each shoulder 17 with a recess 18 to be entered by a locking lip 19 on the inner extremity of each of the end sections so that the frame cannot be fully assembled unless the blade holding means are in alinement and when fully assembled, relative rotary movement between its sections is positively prevented.

As may be best seen in Fig. 4, the blade holding means of the end section 11 consists of an open-ended slot 20 in its inner wall which is of a width slightly greater than the thickness of the saw blade 13. By this construction, one end 14 of the saw blade 13 may be inserted into the slot 20 so that its stud 15 enters the section 11 thereby to lock that end of the blade 13 thereto when the blade 14 is tensioned.

The corresponding extremity of the section 12 is bifurcated and the thus established slot 21, which is of sufficient width to accommodate the blade 13, is in alinement with the blade slot 20. I have shown a lever 22 having sides 23 each of which is pivotally connected by a pivot 24 to the bifurcated extremity of the end section 12 to establish a bell crank. While the sides 23 are spaced apart to straddle the section 12 and are shaped to be comfortable when gripped by the user, I have indicated a zone 25 in that portion of the lever adjacent its pivot which clears the bifurcated extremity of the section 12 when the lever 22 is swung from a first position indicated in dotted lines in Fig. 5 into its second position shown in full lines in Fig. 5. In the zone 25, the distance between the sides 23 decreases, towards the pivoted end of the lever 22, from a width greater than the length of the stud 15 to a width which is only slightly greater than the thickness of the blade 13.

I provide the lever 22 with a blade receiving slot 26 which is open at its pivoted end and has its closed end disposed in the widest part of the zone 25. The slot 26 has an enlargement 27, adjacent its closed end, dimensioned to accommodate a stud 15 so that when the lever 22 is in its first position and the blade 13 is attached at one end to the end section 11 of the frame, its other end 14 and its stud 15 may be attached to the lever 22 by simply positioning the lever so that it may be inserted therein.

In the zone 25, the sides 23 have transversely alined cam slots 28. After a blade end has been inserted through the entrance slot 26 and the lever 22 is swung towards the rear, the stud 15 is prevented from escaping from the lever 22 and is guided into the slots 28 which are disposed to receive and support its extremities as the lever is swung upwardly into its second position. In said second position of the lever 22, the stud 15 supported thereby has been swung about the bifurcated extremity of the section 12 into a position above and rearwardly of the pivots 24 thereby to tension the blade 13 with the tension locking the lever 22 from being accidentally released and with the blade 13 extending through the slot 21.

In practice, the cam slots 28 have pockets 29 entered by the stud ends when the lever is in its second or locked position.

I prefer that the extensions 16 be of sufficient length so that an untensioned blade connected to the outer extremity of the frame end 11 and to the lever 22 on the outer extremity of the frame end 12 may hold the frame sections together.

From the foregoing, it will be apparent that my invention has several important features and advantages. It provides a sectional frame which can be readily slipped apart when the blade is untensioned to relieve the frame from the strain which locks its sections rigidly together, and which can be as readily assembled without catches or screws. While it is an important feature that my invention makes possible saw frames which, when disassembled, can be easily carried in the knapsack of a hunter or woodsman, it is also to be noted that the use of an intermediate section 10 makes possible the use of a shorter or longer saw blade by simply substituting an intermediate section 10 of appropriate length.

It will also be apparent that my blade holding and tensioning means are likewise of marked importance as they enable a saw blade having studs at its ends to be quickly attached and tensioned and as quickly untensioned and detached.

What I therefore claim and desire to secure by Letters Patent is:

1. A saw frame for a blade having a transverse stud adjacent one of its ends, said frame including first and second ends, at least one of which is of resilient stock, means to connect the other end of said blade to said first frame end, said second frame end having an open-ended blade receiving slot, a lever including a pair of sides pivotally connected to said second frame end to swing thereabout on an axis intersecting its slot at right angles between first and second positions, said lever having an open-ended blade entrance slot in alinement with said blade receiving slot and having an enlargement adjacent its closed end dimensioned to receive said stud thereby to enable the stud end of said blade to be entered through said lever into the chamber defined by it and its sides, said sides in the zone of said enlargement being spaced apart to receive said stud and being inclined towards each other in the direction of the open end of said entrance slot to receive said blade but to exclude said stud, said side walls having transversely alined cam slots, in the zone wherein they are inclined, disposed to receive and support the ends of said stud, said lever in said first position being disposed with its entrance slot opening towards the first frame end and spaced therefrom to enable the stud end of said blade to be inserted into the chamber through said entrance slot when the other blade end is connected to said first frame end and in said second position, said second frame end being disposed between said first frame end and said cam slot with said blade passing through said second frame end slot, the ends of said stud entering said cam slots as said lever is moved from said first position towards said second position, and said cam slots being dimensioned and located so that in said second position said blade and said frame are tensioned and said stud is positioned relative to the pivotal connection between said lever and said second frame end to resiliently hold said lever against movement towards its first position.

2. A saw frame for a blade having a transverse stud adjacent one of its ends, said frame including first and second ends, at least one of which is of resilient stock, means to connect the other end of said blade to said first frame end, said second frame end having an open-ended blade receiving slot, a lever including a forked end pivotally connected to said second frame end to swing thereabout on an axis intersecting its slot at right angles between first and second positions and defining a slot in alinement with said blade receiving slot a portion of which is of sufficient width to receive said blade and its stud and the open end portion of which is of a width to receive said blade but to exclude said stud, said lever in said first position being disposed with its entrance slot opening towards the first frame end and spaced therefrom to enable the stud end of said blade to be inserted into the first named portions of the lever slot when the other blade end is connected to said first frame end and in said second position, being disposed with said blade passing through said second frame end slot and said second frame end between it and said first frame end, said stud advancing towards said end portion of said lever slot as said lever is moved from said first position, and said forked end having means to receive and confine said stud during such advance, said means being dimensioned and located so that in said second position said blade and said frame are tensioned and said stud is positioned relative to the pivotal connection between said lever and said second frame end to resiliently hold said lever against movement towards its first position.

DELMER D. TERRILL.

REFERENCES CITED

The following references are of record in the file of this patent:

UNITED STATES PATENTS

| Number | Name | Date |
|---|---|---|
| 589,719 | Griffin | Sept. 7, 1897 |
| 653,947 | Condon | July 17, 1900 |
| 903,495 | Parsons | Nov. 10, 1908 |
| 1,285,869 | Wineman | Nov. 26, 1918 |
| 2,186,386 | Lowell | Jan. 9, 1940 |
| 2,456,764 | Bach | Dec. 21, 1948 |

FOREIGN PATENTS

| Number | Country | Date |
|---|---|---|
| 17,301 | Great Britain | of 1895 |
| 13,382 | Sweden | Nov. 30, 1901 |
| 31,832 | Austria | Feb. 10, 1908 |
| 42,847 | Sweden | July 25, 1917 |
| 48,819 | Sweden | June 27, 1918 |